(12) United States Patent
Barsotti et al.

(10) Patent No.: US 7,815,118 B2
(45) Date of Patent: Oct. 19, 2010

(54) METHOD, DIAPHRAGMS AND OPTICAL RECEIVING DEVICES FOR IMPROVING THE DEPTH OF FIELD IN A LINEAR OPTICAL CODE READER

(75) Inventors: Stefano Barsotti, Pisa (IT); Donato Vincenzi, Cento-FE (IT)

(73) Assignee: Datalogic Scanning Group S.r.l., Lippo di Calderara di Reno (BO) (IT)

( * ) Notice: Subject to any disclaimer, the term of this patent is extended or adjusted under 35 U.S.C. 154(b) by 878 days.

(21) Appl. No.: 11/277,809

(22) Filed: Mar. 29, 2006

(65) Prior Publication Data

US 2007/0119942 A1 May 31, 2007

(30) Foreign Application Priority Data

Nov. 29, 2005 (EP) ................... 05425850

(51) Int. Cl.
*G02B 5/08* (2006.01)
*G02B 26/00* (2006.01)
*G06K 7/10* (2006.01)
*G06K 7/14* (2006.01)

(52) U.S. Cl. ............... 235/462.35; 235/454; 250/237 G; 359/739

(58) Field of Classification Search ............ 235/462.23, 235/462.24, 462.35, 454; 250/237 G; 359/601, 359/613, 614, 618, 738–740
See application file for complete search history.

(56) References Cited

U.S. PATENT DOCUMENTS

| 3,763,351 | A | | 10/1973 | Deerhake | |
|---|---|---|---|---|---|
| 3,853,403 | A | * | 12/1974 | Bentley | ........................ 356/71 |
| 4,570,057 | A | * | 2/1986 | Chadima et al. | ........ 235/462.45 |
| 4,874,933 | A | * | 10/1989 | Sanner | ........................ 235/470 |
| 4,894,523 | A | | 1/1990 | Chadima, Jr. et al. | |
| 5,051,567 | A | * | 9/1991 | Tedesco | .................. 235/462.17 |
| 5,099,109 | A | | 3/1992 | Ishikawa et al. | |
| 5,756,981 | A | * | 5/1998 | Roustaei et al. | ......... 235/462.42 |
| 6,031,224 | A | * | 2/2000 | Peterlechner | ........... 250/231.13 |
| 6,056,198 | A | * | 5/2000 | Rudeen et al. | .......... 235/462.24 |
| 6,685,092 | B2 | * | 2/2004 | Patel et al. | ................... 235/454 |
| 7,057,160 | B2 | * | 6/2006 | Ito | ........................ 250/231.13 |
| 7,212,355 | B2 | * | 5/2007 | Wang et al. | .................. 359/793 |

(Continued)

FOREIGN PATENT DOCUMENTS

DE  2335711 A1  1/1974

(Continued)

OTHER PUBLICATIONS

International Search Report dated Apr. 25, 2006 for European Patent Application No. 05425850.4.

(Continued)

*Primary Examiner*—Michael G Lee
*Assistant Examiner*—Suezu Ellis
(74) *Attorney, Agent, or Firm*—Duane Morris LLP (57) ABSTRACT

A method for improving the depth of field in the detection of a linear optical code includes simultaneously forming two or more overlapped equally focused but differently diaphragmed in phase images of an optical code onto a linear sensor. Diaphragms and optical receiving devices suitable to implement the method are described.

21 Claims, 7 Drawing Sheets

U.S. PATENT DOCUMENTS

2006/0145065 A1* 7/2006 Velikotny et al. ...... 250/231.13

FOREIGN PATENT DOCUMENTS

| DE | 19852464 | A1 | | 5/2000 |
|----|----------|----|----|--------|
| EP | 0563823 | A2 | | 10/1993 |
| EP | 0628796 | A1 | | 12/1994 |
| WO | WO 2005003679 | A2 | * | 1/2005 |

OTHER PUBLICATIONS

Extended European Search Report dated Jun. 19, 2006 for European Patent Application No. 05425850.4.

* cited by examiner 100  101

METHOD, DIAPHRAGMS AND OPTICAL RECEIVING DEVICES FOR IMPROVING THE DEPTH OF FIELD IN A LINEAR OPTICAL CODE READER

FIELD OF THE INVENTION

The present invention relates to optical code readers, and particularly to methods for improving the depth of field in the detection of a linear optical code.

BACKGROUND OF THE INVENTION

Generally, an optical code reader comprises on the one hand a light source and an optical illuminating and/or scanning path which leads from the light source towards the optical code, on the other hand a photosensitive device or sensor and an optical receiving device, arranged in an optical receiving path which leads from the optical code to the sensor. Everything is placed in a suitable housing, provided with at least one window, through which preferably both the optical illuminating path and the optical receiving path pass, namely both the light which from the light source goes to illuminate the optical code, and the light which from the illuminated optical code returns towards the sensor.

As is known, light is absorbed by the dark elements and diffused by the light elements of the optical code, and therefore the signal generated by the sensor at a light element takes up a high value, while the signal generated at a dark element takes up a low value. The sensor therefore generates an alternating electrical signal whose waveform is modulated by the sequence of light/dark elements of the optical code. There is an analogous behaviour in case of linear optical codes which may be read by non-visible electromagnetic radiation, for example IR or UV.

The optical receiving device typically comprises an objective comprising one or more lenses, for collecting and forming the image of the optical code onto the sensor. The design of the objective fixes important parameters of the reader, such as the field of view and the focusing distance, wherein under "field of view" the region "optically subtended" by the sensor through the optical receiving device is meant, i.e. the region from which the sensor receives light through the optical receiving device.

The displacement of the objective moreover permits the adjustment—automatic or manual—of the focusing distance. Indeed, moving the objective closer to the sensor, the conjugate point of the sensor on the object plane is moved further away and accordingly an improved reading at long distance between the reader and the optical code is obtained; on the other hand, moving the objective away from sensor, the conjugate point of the sensor is moved towards the reader and therefore an improved reading at small-distance between the reader and the optical code is obtained.

Both in the optical code readers of portable type and in those of fixed type, it is appropriate that the reading of the optical code can correctly occur also for different distances between the reader and the optical code. It is therefore appropriate, besides the capability of adjusting the focusing distance, for the optical receiving device to have an adequate depth of field.

Under "depth of field" the range of reader-optical code distances within which the elements of an optical code may be resolved is meant. The depth of field therefore depends, besides on the characteristics of the optical device, also on the resolution of the optical code.

It is furthermore appropriate for a reader to be capable of reading optical codes of different resolution, wherein the "resolution" is measured in terms of the size of the thinner element of the code, called "module" of the optical code.

The optical receiving device typically comprises, upstream or downstream of the objective, a diaphragm meant as an opaque screen stopping the light, having a light passing aperture so that, of a beam of light rays incident on the diaphragm, the rays which pass through the aperture contribute to the formation of the image onto the sensor, while those intercepted are excluded therefrom.

The known linear optical code readers typically comprise, in the optical receiving path, a diaphragm having only one aperture, typically of a rectangular shape, for example as described in U.S. Pat. No. 4,894,523, the entirety of which is incorporated by reference herein, whose smaller side in use is oriented along the optical code direction and whose greater side in use is along the direction of the elements of the optical code (bars and spaces). With reference to a horizontal orientation of the linear optical code direction, the smaller side of the diaphragm is indicated as the "width" and the greater side is indicated as the "height". Reference is made hereinafter to such an orientation, for the sake of convenience, but without limiting in any manner the generality of the invention.

The use of a rectangular diaphragm for reading a linear optical code permits both an increase in the resolution of the reader, i.e. the capability of reading optical codes of higher resolution, and an increase in the depth of field with respect to the case of a reader without diaphragm, since a reduction of the aberrations along the scanning direction of the optical code is obtained.

According to the required performance of the optical code scanning device, the size of the diaphragm must be optimised.

Reducing the size of the smaller side of the diaphragm or width, an increase in the depth of field is generally obtained. However, simultaneously, there is also a reduction of the amount of light which reaches the sensor and therefore a reduction of the electrical output signal.

By a further reduction of the size of the smaller side of the diaphragm, the negative effects of the diffraction phenomenon are however increased. The diffraction limits the performance of the optical receiving device with consequent decrease of the depth of field. Because of the diffraction phenomenon, in fact, the plane of higher resolution moves away from the geometric focus, approaching the reader. This phenomenon generally causes a loss of resolution of the optical receiving device and a reduction of the depth of field.

The increase of the size of the greater side of the diaphragm or height leads to an advantageous increase of the amount of light which reaches the sensor, keeping the depth of field unaltered; however, in this case, the sensitivity of the optical receiving device to the "tilt angle" increases, wherein under "tilt angle" the angle comprised between the direction of the bars and spaces of a particular optical code being read and the direction perpendicular to the scanning line is meant. Such increase makes a correct reading of the optical code difficult and sometimes impossible when such tilt angle is greater than a threshold value, variable according to the situation.

In summary, a diaphragm with a narrower aperture permits having a better defined image from close up, where the amount of available light is also greater, but cannot be used in an advantageous manner for long-distance reading of the optical code, and vice versa a diaphragm with a wider aperture permits having a better defined image from a distance, but cannot be used in an advantageous manner for small-distance reading of the optical code, especially in case of high resolution optical codes.

Therefore, there remains a need for method of improving the average reading performance of an optical code reader in terms of depth of field.

SUMMARY OF THE INVENTION

A method for improving the depth of field in the detection of a linear optical code includes simultaneously forming two or more overlapped equally focused but differently diaphragmed in phase images of an optical code onto a linear sensor. Diaphragms and optical receiving devices suitable to implement the method are described.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

The invention relates to a method for improving the depth of field in the detection of a linear optical code, comprising simultaneously forming two or more equally focused but differently apertured in phase images of an optical code on a linear sensor. Diaphragms and optical receiving devices suitable to implement the method are described.

Within the present description and attached claims, under "optical code" it is meant to indicate a sequence of elements of different colour, typically white and black, in the number and/or relative size of which information is codified. Under "linear optical code" it is meant to indicate an optical code locally invariant in a direction orthogonal to the direction in which the information is codified, also called the scanning direction or "optical code direction", hence readable with a linear optical code reader. Examples of such linear optical codes are bar codes and postal codes, but also stacked codes, wherein the code is locally invariant or invariant in sections in the direction orthogonal to the optical code direction.

According to the invention, this is obtained through the simultaneous formation of two or more equally focused but differently diaphragmed in phase images of an optical code onto a linear sensor. Where the aperturing is narrow, a better defined image from close up is provided, and where the aperturing is wide, a better defined image from a distance is provided.

In the present description and attached claims, under "in phase images" it is meant to indicate overlapping images having maxima, minima and inflexion points at corresponding positions.

The invention regards, in one aspect thereof, a method for improving the depth of field in the detection of a linear optical code, in particular a method for improving the depth of field in the detection of a linear optical code comprising the steps of: (a) forming a first image of the optical code onto a linear sensor, through an objective having first parameters of focal distance and magnification and an aperture having a first smaller dimension in the direction substantially parallel to the direction of the optical code, and (b) simultaneously forming at least one second image of the optical code onto said linear sensor, through said objective or an objective having said first focal distance and magnification parameters and an aperture having a second smaller dimension in the direction substantially parallel to the direction of the optical code, said second smaller dimension being different from said first smaller dimension, wherein said first and said at least one second image are in phase.

Inventive diaphragms for implementing the above method in a linear optical code reader comprise a light stopping portion and a light passing portion having a non-constant smaller dimension or width, for example comprising two substantially rectangular aperture zones, an aperture zone having the shape of an irregular polygon, in particular a trapezium, or also an aperture zone having one or more curvilinear sides.

The invention regards, in another aspect thereof, a diaphragm for implementing the above method in a linear optical code reader, comprising a light stopping portion and a light passing portion, characterised in that the light passing portion has a first section having a constant first smaller dimension and at least one second section having a constant second smaller section, said second smaller dimension being different from said first smaller dimension.

In use of the diaphragm, the smaller dimension (width) is arranged substantially along the direction of the optical code, and the greater dimension (height) is substantially along the direction of the elements of the optical code.

Through the non-constant smaller dimension (width) of the light passing portion, it is possible to simultaneously exploit the characteristics of both narrow diaphragms and wide diaphragms, increasing the versatility of the reader with respect to the depth of field without remarkably sacrificing the resolution, and therefore permitting reading at different reader-optical code distances.

Because in the case of bar codes, postal codes or stacked codes, the image of the optical code is locally invariant along the direction of the elements of the optical code, it is in such a manner moreover permitted to make a large light passing portion in the direction of the code elements, which therefore permits the passage of a large amount of light, and therefore permits obtaining a high intensity of the signal collected by the sensor.

In such a manner, two or more aperture zones are defined in the light passing portion, with smaller dimensions which may be independently chosen so that each provides a different performance, and combined to provide reading performance with intermediate characteristics.

In particular, it is possible to lower the minimum limit of the depth of field (i.e. permit readings from closer distances) with respect to that obtainable with a diaphragm having a single wide rectangular aperture and, at the same time, it is possible to increase the maximum limit of the depth of field (i.e. permit readings from greater distances) with respect to that obtainable with a diaphragm having a single narrow rectangular aperture.

In a particularly preferred embodiment, said light passing portion has at least two substantially rectangular aperture zones having at least two different smaller dimensions.

In the present description and attached claims, under the term "rectangular" it is meant to indicate a shape having four substantially right angles, a square therefore being comprised in the term, as rectangles and squares with rounded corners are comprised in the expression "substantially rectangular".

Preferably, said light passing portion is formed by two or three substantially rectangular aperture zones with at least two different smaller dimensions.

The two or more substantially rectangular zones may be adjoining, so that said light passing portion comprises a single aperture, but according to the preferred embodiment there are at least two non-adjoining substantially rectangular aperture zones.

In other words, experimentally it resulted particularly advantageous to provide a cross wall of said light stopping portion between the substantially rectangular zones, by which the two substantially rectangular aperture zones are spaced.

Preferably, the distance between the two substantially rectangular aperture zones, i.e. the cross wall size, has a value comprised in the range between 0.01 and 1.0 mm, preferably between 0.1 and 0.3 mm.

Independently of the absence or presence of the cross wall, more preferably the smaller dimensions of said at least two aperture zones are not completely offset, so that at least 50%, more preferably at least 75%, even more preferably 100% of the shortest smaller dimension is aligned with the longest smaller dimension.

In such a manner it is assured that the images of the optical code produced by the aperture zones are in phase even in defocusing conditions.

In the preferred embodiment of the invention, the smaller dimensions of the two or more aperture zones are centrally aligned.

In such a manner, each aperture zone contributes to the formation of an image which is exactly in phase with that formed by the other aperture for every position of the object plane, thus determining an image on the sensor which is given by the sum of the two distinct images. In this manner, on the sensor the maximum of the information emitted by the optical code is obtained, whatever the distance between optical code and diaphragm.

More in general, it is advantageous when said light passing portion has a symmetry axis, which in use of the diaphragm is perpendicular to the scanning direction of the linear optical code, i.e. perpendicular to the direction of the optical code in ideal alignment conditions between the reader and the optical code.

In order to increase the amount of light collected from the single elements of the optical code, at least one of said first and second substantially rectangular aperture zones preferably has an aspect ratio greater than 1.2:1, more preferably greater than 1.5:1, and even more preferably between 1.5:1 and 4:1.

Preferably, the smaller dimension and the greater dimension of a first one of said substantially rectangular aperture zones are comprised, respectively, in the ranges between 0.4 and 2.0 mm and between 0.5 and 4.0 mm.

Preferably, moreover, the smaller dimension and the greater dimension of a second of said substantially rectangular aperture zones are respectively comprised in the ranges between 0.2 and 1.0 mm and between 0.24 and 2.0 mm.

Preferably, when there are only two substantially rectangular aperture zones, their greater dimensions extend in different half planes of the diaphragm, with respect to the intersection between the diaphragm plane and the plane containing the optical axis and the sensitive line of the sensor, typically such intersection being the centreline of the diaphragm parallel to the smaller dimension.

In such a manner, the contribution of the two aperture zones is symmetrically arranged with respect to a linear sensor arranged facing the aforementioned intersection, generatrix of the two half planes.

Advantageously, the light passing portion has a smaller dimension which is comparably small in proximity to the centreline of the diaphragm parallel to the smaller dimension.

In such a manner, through the narrow aperture zone an image centred on the sensitive line of the sensor is obtained, an advantageous aspect in situations when it is desired to favour reading high resolution codes in proximity to the reader.

In one embodiment, the diaphragm of the invention comprises an aperture zone of smaller dimension which is comparably small and centred with respect to the diaphragm, and two aperture zones of smaller dimension which is comparably large, and symmetrically arranged with respect to the centreline of the diaphragm parallel to the smaller dimension.

In another aspect thereof, the invention regards a diaphragm for implementing the above method in a linear optical code reader, comprising a light stopping portion and a light passing portion, characterised in that the light passing portion has a non-constant smaller dimension, wherein the light passing portion has at most one axis of symmetry.

Also in this case, the light passing portion has preferably a smaller dimension which is comparably small in proximity to the centreline of the diaphragm parallel to the smaller dimension.

In particular, the light passing portion may have the shape of a trapezium, preferably an isosceles trapezium.

In a further aspect thereof, the invention regards an optical receiving device for a linear optical code reader comprising an objective and a diaphragm as previously described.

The diaphragms of the invention may be placed before, after or within the objective, if this comprises several lenses. Alternatively, the diaphragms may be directly applied on the objective (or on one of the lenses composing it) by means of gluing or they may even be made on the objective itself by means of methods such as spraying, sputtering, evaporation, tampography, painting, etc.

In another aspect, the invention regards an optical receiving device for implementing the aforementioned method in a linear optical code reader, comprising an objective having first parameters of focal distance and magnification and an aperture having a first smaller dimension, and a second objective having said first parameters of focal distance and magnification and an aperture having a second smaller dimension, said second smaller dimension being different from said first smaller dimension, arranged to form two in phase images of a linear optical code onto a linear sensor.

In one embodiment, the first and the second objective are half-lenses or portions of lenses.

In another embodiment, the first and the second objective are respectively associated with two diaphragms, each with a single substantially rectangular aperture zone, and moreover deflection means are provided for forming two in phase images of an optical code onto a linear sensor.

The apertures may be formed on separate diaphragms or on a same diaphragm, which can be placed before, after or within the objectives, if these comprise several lenses or lens portions. Alternatively, the diaphragms may be directly applied on the objective (or on one of the lenses composing it) through gluing or they may even be made on the objective itself by means of methods such as spraying, sputtering, evaporation, tampography, painting, etc.

The deflection means may comprise two prisms. With this simple configuration it is possible to obtain optical paths of the light forming the two in phase images which are of equal length.

Alternatively, it is possible to use either a series of mirrors positioned in an appropriate manner so as to obtain a deflection of the light beams identical to that produced by the two prisms, or diffraction gratings which reproduce the same action as the prisms.

In another aspect thereof, the invention regards a linear optical code reader comprising one of the optical receiving devices described above and a linear sensor.

The invention therefore finds application in a particularly useful manner for readers of the "imaging" type.

Under the indication of "imaging" type, it is meant that category of readers in which reading of the optical code occurs by means of simultaneous illumination of the entire optical code, and acquisition of its overall image and transformation into an electrical signal by means of a unidimensional sensor, such as for example a sensor of Charge-Coupled Device type (CCD) or of Complementary Metal-Oxide Semiconductor type (C-MOS).

The optical codes may be selected among bar codes, postal codes and stacked codes.

The present invention finds an application in reading optical codes having a resolution comprised between 3 mil and 55 mil and, in particularly advantageous manner, in reading optical codes having a resolution comprised between 4 mil and 20 mil, which are moreover the most common resolutions on the market.

Further features and advantages of the present invention will become more evident from the following detailed description of its preferred embodiments thereof, made with reference to the attached drawings. In the drawings:

In the remainder of the present description, the terms vertical, horizontal, height and width are referred the orientation shown in the figures, but must not be understood as absolute spatial reference terms.

Figure 1:
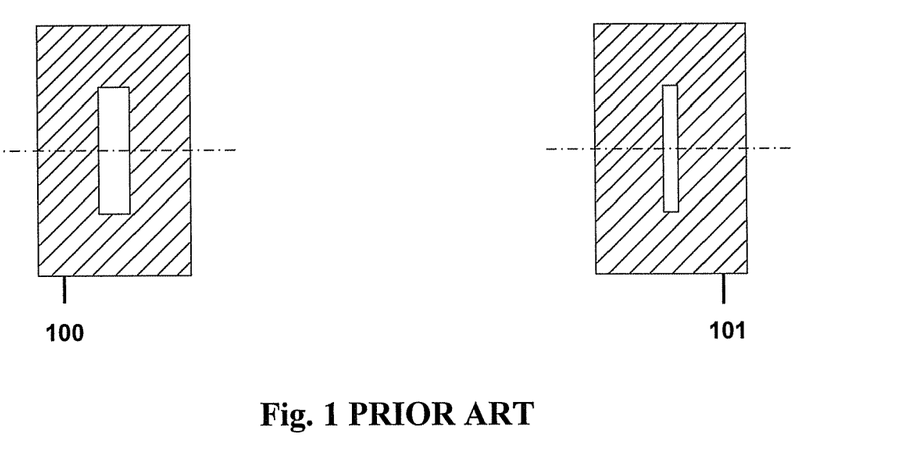
FIG. 1 shows a front view of two different, traditional diaphragms for comparison, 100 and 101, each with a single rectangular aperture.

In FIG. 1, examples of traditional diaphragms 100 and 101 are shown, for reading linear optical codes in the meaning stated above, namely linearly invariant in one direction, such as bar codes, postal codes and stacked codes. Diaphragms 100 and 101 are of elongated rectangular shape, having the same greater dimension or height, but different smaller dimension or width; indeed, diaphragm 100 measures 0.8×4.0 mm, while diaphragm 101 measures 0.5×4.0 mm.

Figure 2:
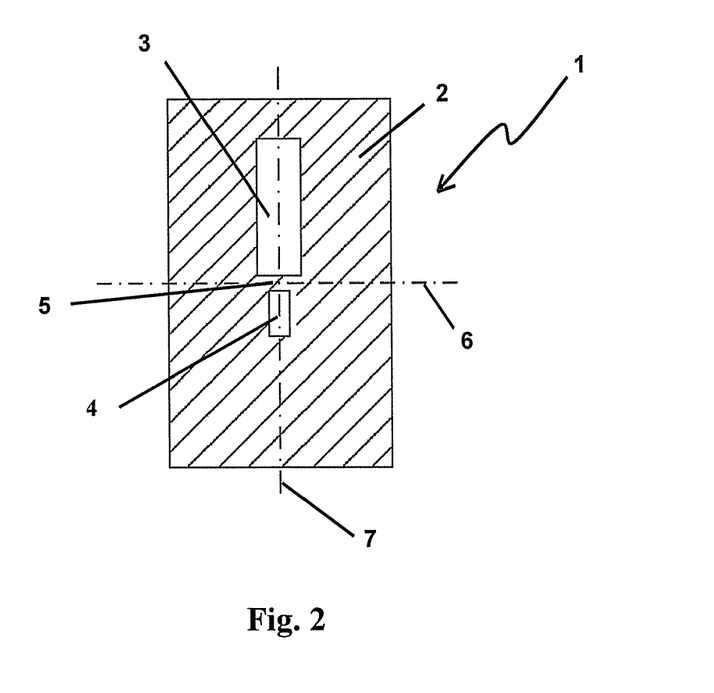
FIG. 2 shows a front view of a first embodiment of a diaphragm according to the present invention.

In FIG. 2, a preferred embodiment of a diaphragm 1 according to the present invention is shown.

Diaphragm 1 comprises an opaque screen on which a light stopping portion 2 and a light passing portion comprising two aperture zones 3 and 4 are defined.

Although diaphragm 1 is illustrated with a rectangular outer shape, it could alternatively have any outer shape.

Each aperture zone 3, 4 is of rectangular shape.

As an example, aperture zone 3 measures 0.8×2.9 mm, while aperture 4 measures 0.5×0.9 mm. The ratio between the greater dimension or height and the smaller dimension or width of said aperture zone 3 is about 3.6:1, while the ratio between height and width of said aperture zone 4 is 1.8:1. The two aperture zones 3 and 4 are separated by a cross wall 5 of said light stopping portion 2, in particular having a height of 0.2 mm.

Cross wall 5 is aligned with the horizontal centreline 6 of diaphragm 1 or optical axis 6, so that the two aperture zones 3, 4 are arranged in two different half planes of the diaphragm 1.

In this manner, the paraxial light rays strike both the wide aperture zone 3 and the narrow aperture zone 4. The light passing portion 3, 4 may alternatively be centred with respect to the diaphragm 1. In such a manner, however, the narrow aperture zone 4, which would result entirely below the optical axis 6, would be associated with a large component of non-paraxial rays, with the consequent formation of a more aberrated image by the narrow aperture zone 4.

The two aperture zones 3 and 4 are moreover arranged centrally aligned with each other to define a symmetry axis 7 of the light passing portion 3,4, which is arranged along the vertical centreline of diaphragm 1.

Figure 3:
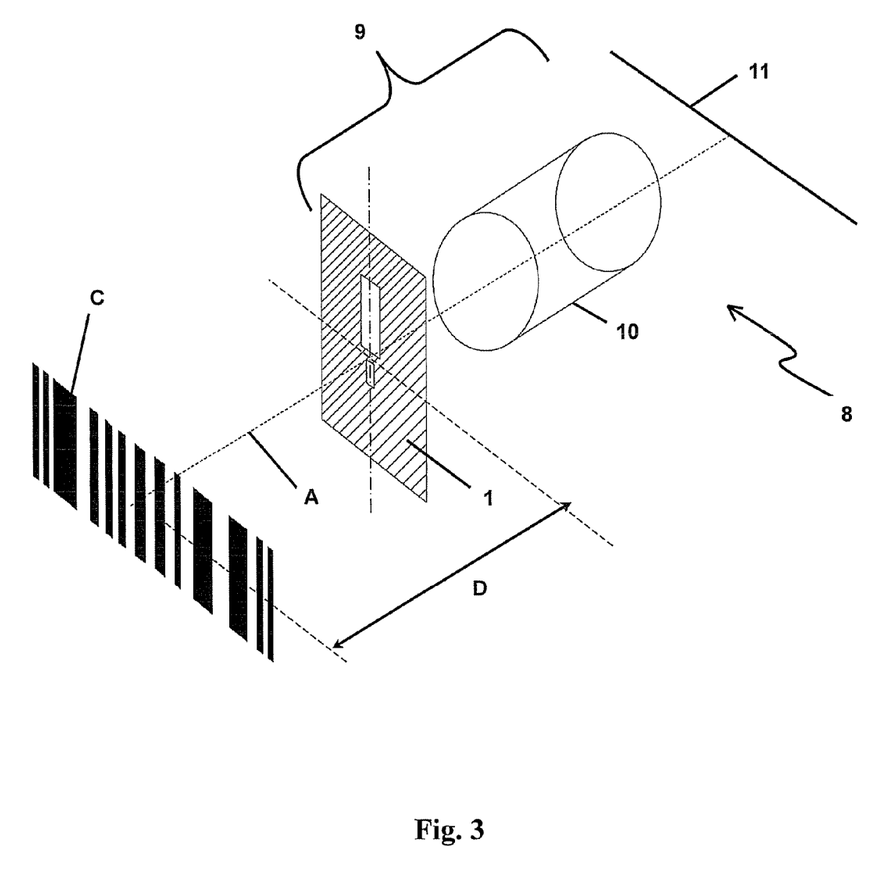
FIG. 3 shows a diagrammatic perspective view of the receiving section of a linear optical code reader in accordance with the present invention.
Figure 4:
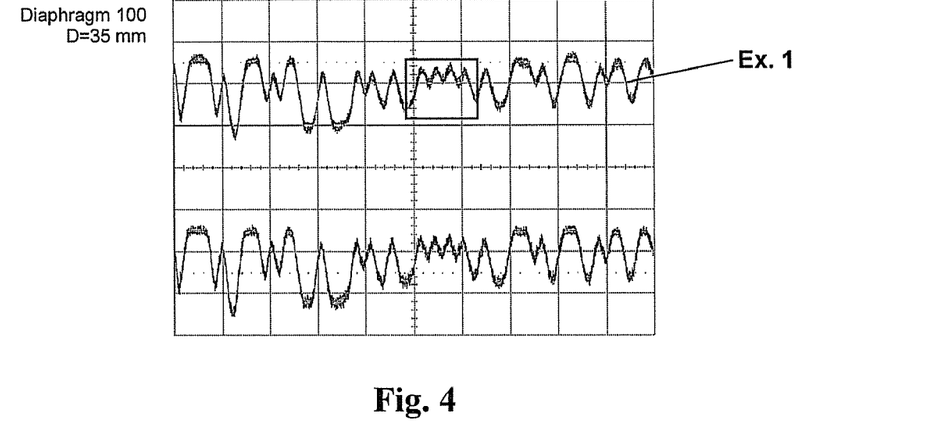
FIG. 4 shows the signal acquired with an oscilloscope at the output of a sensor associated with an objective and comparison diaphragm 100, with the optical code placed at an object distance of 35 mm.
Figure 5:
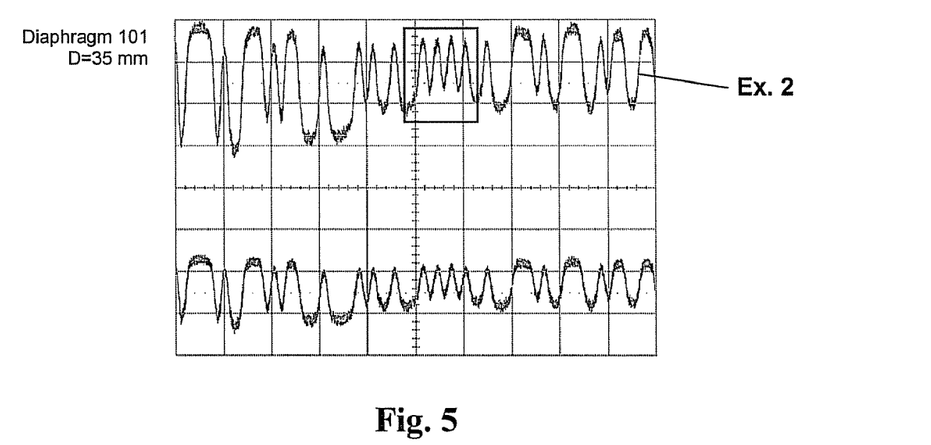
FIG. 5 is analogous to FIG. 4, but with comparison diaphragm 101.
Figure 6:
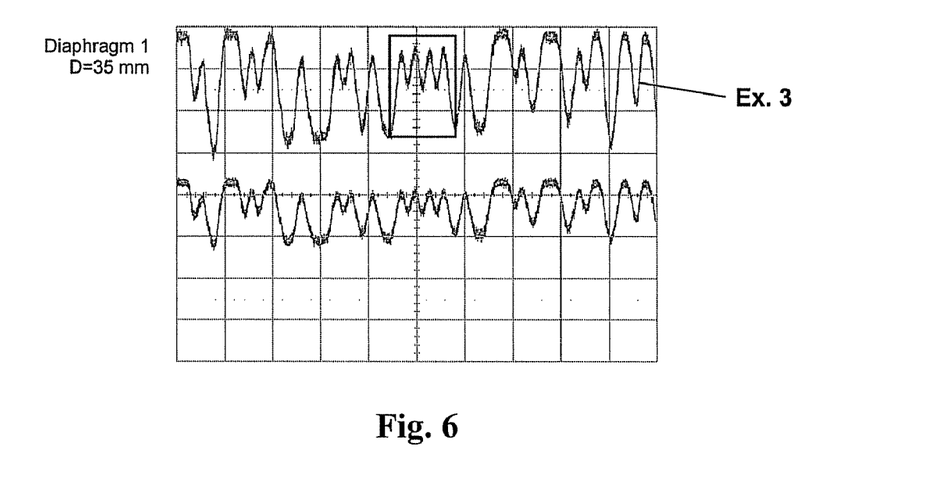
FIG. 6 is analogous to FIG. 4, but with the diaphragm of FIG. 2.
Figure 7:
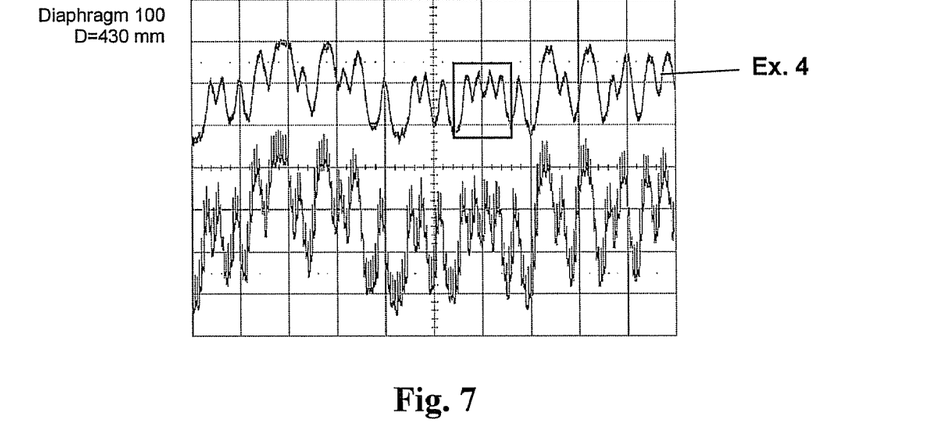
FIG. 7 is analogous to FIG. 4, with comparison diaphragm 100 and the optical code placed at an object distance of 430 mm.
Figure 8:
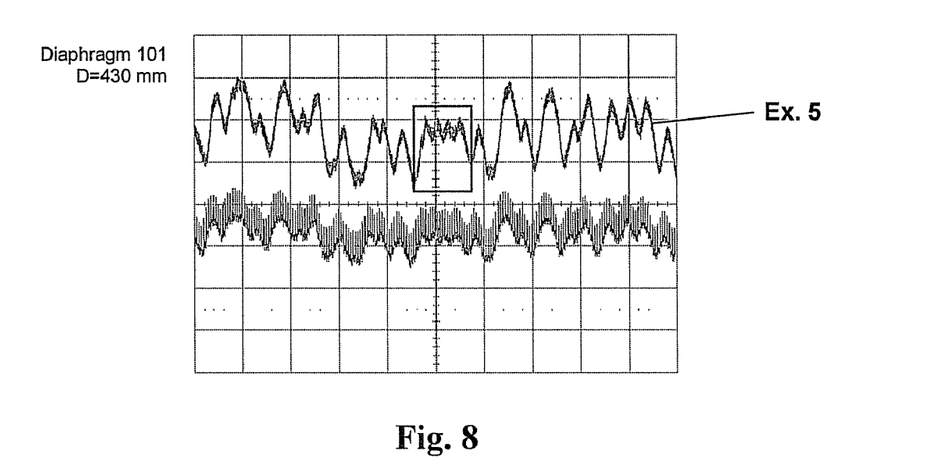
FIG. 8 is analogous to FIG. 7, but with comparison diaphragm 101.
Figure 9:
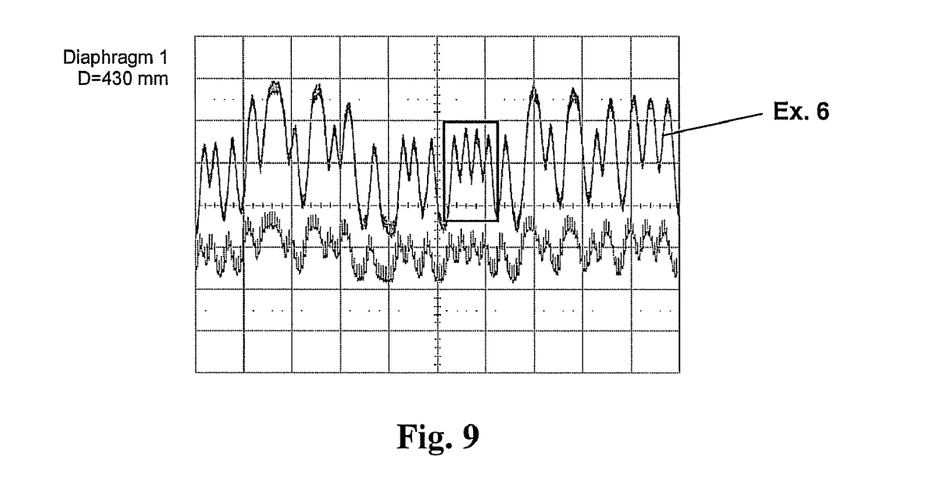
FIG. 9 is analogous to FIG. 7, but with the diaphragm of FIG. 2.

FIG. 3 shows a diagrammatic perspective view of diaphragm 1 in use in a receiving section 8 of a linear optical code reader in accordance with the present invention.

The receiving section 8 of the reader comprises an optical receiving device 9 comprising diaphragm 1 and an objective 10 comprising one or more lenses.

The receiving section 8 of the reader moreover comprises a photosensitive device or linear sensor 11 arranged on the other side of the optical receiving device 9 with respect to an optical code C, in the image plane of the objective 10. The sensor 11 is for example of Charge-Coupled Device type (CCD) or of Complementary Metal-Oxide Semiconductor type (C-MOS).

The object distance between optical code C and diaphragm 1 is indicated with D.

It should be noted that the smaller dimensions (widths) of the aperture zones 3, 4 and the horizontal centreline 6 are aligned with the direction of optical code C, while the greater dimensions (heights) of the aperture zones 3, 4 and the vertical centreline or symmetry axis 7 of diaphragm 1 are aligned with the direction of the elements of optical code C.

The intersection between the centrelines 6, 7 or centre of the diaphragm 1 is moreover arranged on the optical axis A of objective 10.

It is worthwhile emphasising that diaphragm 1 may be arranged upstream of objective 10—between objective 10 and optical code C to be read, as illustrated—, downstream of objective 10, or between objective 10 and sensor 11, or within the set of lenses composing objective 10.

Diaphragm 1 may moreover be directly applied on objective 10, or on one of the lenses composing it, by means of gluing or it may even be made on the objective 10 itself by means of methods such as spraying, sputtering, evaporation, tampography, painting, etc.

The illuminating section of the reader 8 and the other optical components such as possible deflection mirrors, as well as electrical and logical components of reader 8, are not illustrated, since they may be of any type known in the field. They preferably comprise one or more sources of LED type with an appropriate illuminating optics comprising for example one or more focusing lenses and possible diaphragms.

EXAMPLES

The performance of the diaphragm 1 of the invention was compared with the performance of the two comparison diaphragms 100 and 101 of FIG. 1, as discussed in the following examples.

For a correct interpretation of the examples, it should be noted that the aperture zone 3 of the diaphragm 1 of the invention has a width (0.8 mm) equal to the width of the aperture of the comparison diaphragm 100 illustrated in FIG. 1, while the aperture zone 4 of the diaphragm 1 of the invention has a width (0.5 mm) equal to the width of the aperture of the comparison diaphragm 101 illustrated in FIG. 1. Moreover, the height (4.0 mm) of the comparison diaphragms 100, 101 is equal to the sum of the height (2.9 mm) of aperture zone 3, the height (0.9 mm) of aperture zone 4 and the height of cross wall 5 (0.2 mm) which divides the two aperture zones 1 and 2 of the diaphragm 1 of the invention.

Example 1

The configuration of FIG. 3 was modified by replacing diaphragm 1 with the previously described comparison diaphragm 100, having a single aperture of a rectangular shape of 0.8×4.0 mm size. The output signals of the sensor 11, related to a generic bar code C of 13 mil resolution placed at an object distance D of 35 mm, were then acquired with an oscilloscope. An oscilloscope was connected to the output of sensor 11.

Example 2

Example 1 was repeated, with the difference that comparison diaphragm 100 was replaced by the previously described comparison diaphragm 101, having a single aperture of rectangular shape of 0.5×4.0 mm size.

Example 3

Example 1 was repeated, with the difference that comparison diaphragm 100 was replaced by the diaphragm 1 of the invention, having two aperture zones 3, 4 of rectangular shape and of respective size of 0.8×2.9 mm and 0.5×0.9 mm, separated by a cross wall of 0.2 mm.

Example 4

Example 1 was repeated, with the difference that the generic bar code C was placed at an object distance D of 430 mm.

Example 5

Example 4 was repeated, with the difference that comparison diaphragm 100 was replaced by comparison diaphragm 101.

Example 6

Example 4 was repeated, with the difference that comparison diaphragm 100 was replaced by the diaphragm 1 of the invention.

The signals acquired with the oscilloscope of Examples 1-6 are, respectively, reproduced in FIGS. 4-9. It should be noted that two signals are shown in each figure, a bottom one and a top one, which refer to the analog output signal of the sensor and respectively to the properly filtered and amplified analog signal.

From an examination of these results, it appears that for signals acquired in proximity to reader 8 (Examples 1-3, object distance D equal to 35 mm), the signal dynamics with regard to the narrower bars, highlighted with a rectangle, is improved when comparison diaphragm 101 (Example 2, FIG. 5) having a narrower aperture (0.5 mm) is used, with respect to when comparison diaphragm 100 (Example 1, FIG. 4) is used, which is at the limit of readability.

The signal obtained with the diaphragm 1 of the invention (Example 3, FIG. 6) shows an intermediate result between that obtained with diaphragm 100 and that obtained with diaphragm 101.

On the other hand, for the signals acquired at a long distance from the optical code (Examples 4-6, object distance D equal to 430 mm), the signal dynamics with regard to the narrower bars, highlighted with a rectangle, is improved when comparison diaphragm 100 (Example 4, FIG. 7) having a wider aperture (0.8 mm) is used, with respect to when comparison diaphragm 101 (Example 5, FIG. 8) is used, which is at the limit of readability.

Also in this case, the signal obtained with the diaphragm 1 of the invention (Example 6, FIG. 9) shows an intermediate result between that obtained with diaphragm 100 and that obtained with diaphragm 101.

It may therefore be understood from these examples that the use of diaphragm 1 having a light passing portion defined by two aperture zones 3, 4, according to one embodiment of the invention, permits on the one hand lowering the minimum limit of the depth of field with respect to the minimum limit of the depth of field in case of use of a diaphragm with a single wide rectangular aperture, and on the other hand increasing the maximum limit of the depth of field with respect to the maximum limit of the depth of field in case of use of a diaphragm with a single narrow rectangular aperture.

Examples 7-9

The configurations of Examples 1-3 were used for identifying the extremes of the depth of field for a code of 20 mil resolution, in other words the object distance D was changed until the values beyond which the optical code C could no longer be resolved were identified, respectively with comparison diaphragm 100, with comparison diaphragm 101 and the diaphragm 1 of the invention.

Examples 10-12

The Examples 7-9 were repeated, but with a code with resolution of 13 mil.

Examples 13-15

The Examples 7-9 were repeated, but with a code with resolution of 7.5 mil.

Example 16-18

The Examples 7-9 were repeated, but with a code with resolution of 5 mil.

Figure 10:
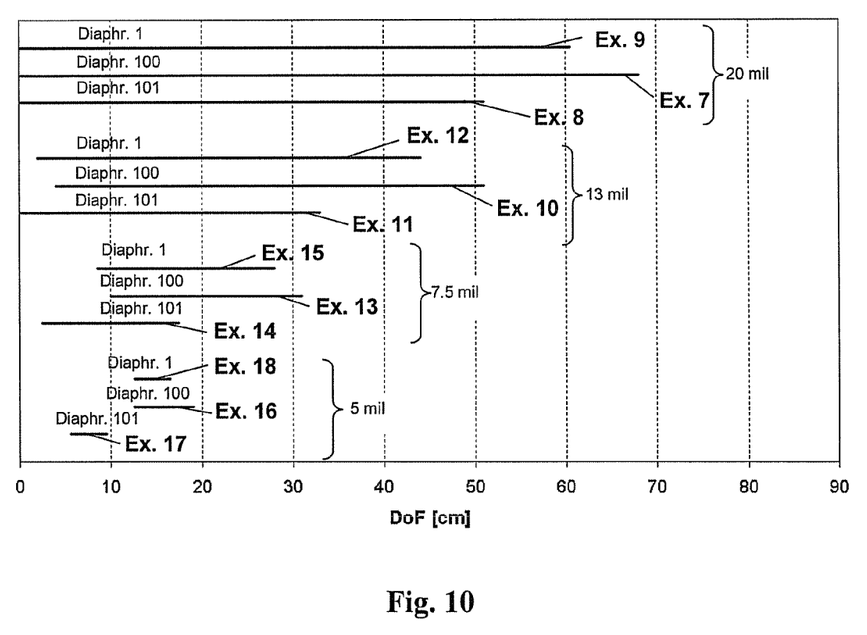
FIG. 10 shows the depth of field values obtained using comparison diagrams 100, 101 and the diaphragm of FIG. 2, for different code resolutions.

In the following table 1 and in FIG. 10 the depth of field values which were obtained for the optical code resolutions used in Examples 7-18 are reproduced.

TABLE 1

| Examples | Code Resolution | Depth of field [cm] | | |
|---|---|---|---|---|
| | | Comparison Diaphragm 100 (0.8 × 4.0 mm) | Comparison Diaphragm 101 (0.5 × 4.0 mm) | Diaphragm 1 of the invention |
| 7-9 | 20 mil | 0-68.0 | 0-51.0 | 0-60.5 |
| 10-12 | 13 mil | 4.0-51.0 | 0-33.0 | 2.0-44.0 |
| 13-15 | 7.5 mil | 10.0-31.0 | 2.5-17.5 | 8.5-28.0 |
| 16-18 | 5 mil | 12.5-19.0 | 5.5-9.5 | 12.5-16.5 |

From an examination of these results, the numeric confirmation of what already generically noted in Examples 1-6 appears, namely an improvement provided by the use of the diaphragm of the invention of the minimum and maximum limits of the depth of field, respectively, with respect to use of a conventional diaphragm with a single, respectively wide and narrow, rectangular aperture.

It is noted that the slight worsening of the maximum and minimum limits of the depth of field, respectively, with respect to use of a conventional diaphragm with a single, respectively wide and narrow, rectangular aperture is wholly acceptable.

Example 19

The configuration of Example 1 was used for identifying the maximum resolution of an optical code readable with comparison diaphragm 100, versus the object distance D, maintaining the focusing distance of the objective 10 at a predetermined value (image distance between objective and sensor equal to 23.3 mm).

Example 20

Example 19 was repeated, with the difference that the comparison diaphragm 100 was replaced by comparison diaphragm 101.

Example 21

Example 19 was repeated, with the difference that the comparison diaphragm 100 was replaced by the diaphragm 1 of the invention.

Figure 11:
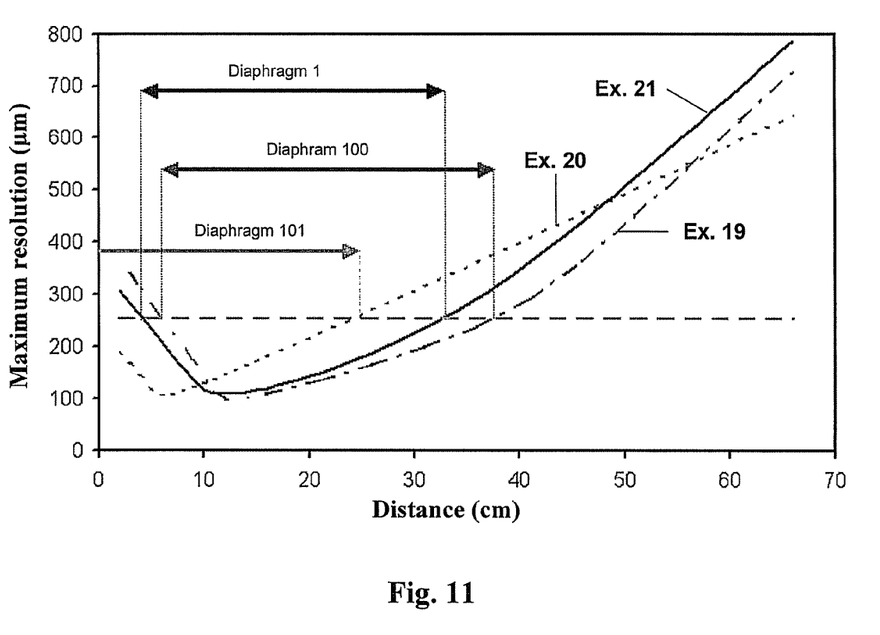
FIG. 11 shows a graph related to the maximum resolution versus the object distance for optical configurations using comparison diaphragms 100 and 101 and the diaphragm of FIG. 2, at the same focusing distance.

In FIG. 11, on the x-axis the values related to the object distance D are reproduced, expressed in centimetres, while on the y-axis the values related to the maximum resolution are reproduced, expressed in μm, for Examples 19-21.

The curves reproduced in this FIG. 11 therefore represent the limit resolution for each of the diaphragms of Examples 19-21; from the intersection points of the various curves with the straight line which identifies a particular resolution, the depth of field for a code with that resolution is obtained.

By way of an example, in FIG. 11, the straight line related to the resolution of 10 mils, equal to about 254 μm, is plotted. It may be noted that the configuration of Example 20, using comparison diaphragm 101 with a single narrow rectangular aperture, is able to resolve the 10 mils optical code practically at any close distance, but only until an object distance D less than 25 cm, above this maximum distance limit it not being possible to resolve such a code. On the other hand, it may be noted that by using the configuration of Example 19, comprising a comparison diaphragm 100 with a single wide rectangular aperture, the long distance reading capability is considerably improved, the upper limit of the depth of field being equal to about 38 cm, but it is not possible to resolve an optical code of such 10 mils resolution at an object distance D less than about 6 cm.

Using the configuration of Example 21, comprising a diaphragm 1 of the invention having a light passing portion defined by the two aperture zones 3, 4, the capability of reading an optical code of 10 mils resolution at small distances is considerably improved, the lower limit of the depth of field being about 4 cm, without losing excessive long distance reading capability, the upper limit of the depth of field being equal to about 33 cm.

Example 22

Example 19 was repeated, once again setting the distance between the objective and the sensor at 23.3 mm.

Example 23

Example 20 was repeated, setting however the distance between the objective and the sensor at 24.8 mm so as to favour, with respect to the configuration of Example 22, the reading at smaller distances and for higher resolution codes.

Example 24

Example 21 was repeated, once again setting the distance between the objective and the sensor at 23.3 mm.

Figure 12:
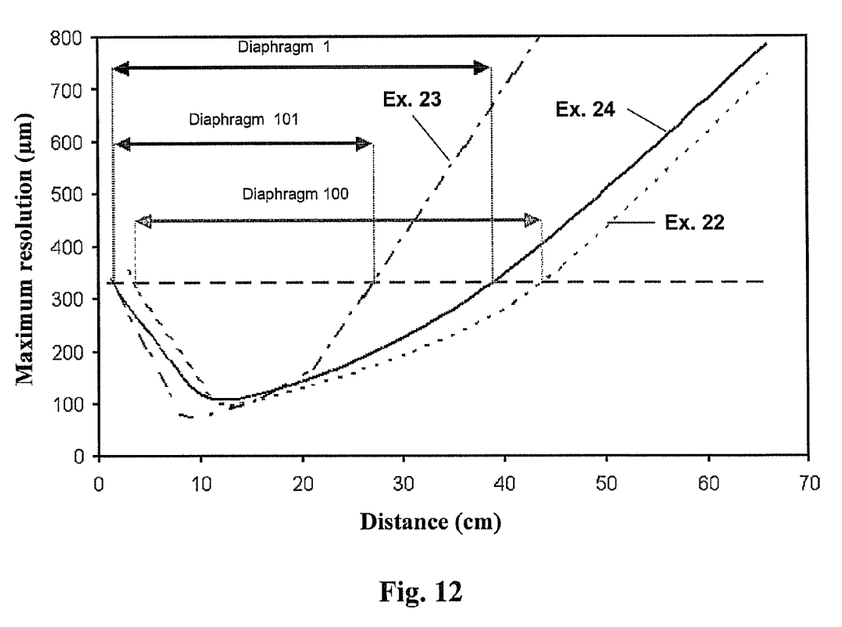
FIG. 12 shows a graph related to the maximum resolution versus the object distance for optical configurations using comparison diaphragms 100 and 101 and the diaphragm of FIG. 2, at different focusing distances.

Analogously to FIG. 11, in FIG. 12 on the x-axis the values related to the object distance D are reproduced, expressed in centimetres, and on the y-axis the values related to the maximum resolution are reproduced, expressed in μm, for the Examples 22-24.

By way of an example, in FIG. 12, the straight line related to the resolution of 13 mils, equal to about 330 μm, is plotted. It may be noted that the configuration of Example 23, using a comparison diaphragm 101 with a single narrow rectangular aperture, is able to resolve the optical code of 13 mils resolution at an object distance D comprised between 1.5 and 27 cm, above this maximum distance limit it not being possible to resolve such an optical code. Also in this case, it may be noted that by using the configuration of Example 22, comprising a comparison diaphragm 100 with a single wide rectangular aperture, the long distance reading capability is considerably improved, the upper limit of the depth of field being equal to about 43.5 cm, However it is not possible to resolve an optical code of such 13 mils resolution at an object distance D less than about 3.5 cm.

Using the configuration of Example 24, comprising a diaphragm 1 of the invention having a light passing portion defined by the two aperture zones 3, 4, the small distance reading capability is considerably improved, the lower limit of the depth of field being about 1.5 cm, without losing excessive long distance reading capability, the upper limit of the depth of field being about 39 cm.

From the above Examples it may be concluded that by using the diaphragm 1 according to the invention, a depth of field which is a good compromise between those obtainable with diaphragm 101 with a single narrow rectangular aperture and with diaphragm 100 with a single wide rectangular aperture is obtained.

Figure 13:
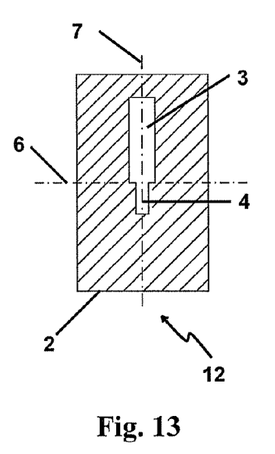
FIG. 13 shows a front view of a second embodiment of a diaphragm according to the present invention.

FIG. 13 shows a second embodiment of a diaphragm 12 according to the present invention, which differs from the first embodiment in that there is no cross wall 5 and the two aperture zones, again indicated with reference 3, 4, are adjoining.

Figure 14:
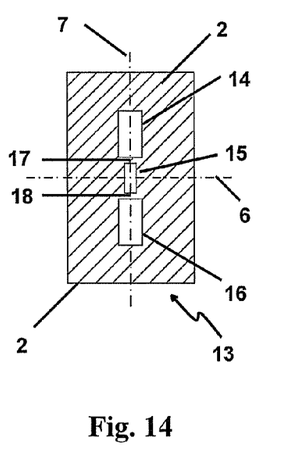
FIG. 14 shows a front view of a third embodiment of a diaphragm according to the present invention.

In FIG. 14, a third embodiment of a diaphragm 13 according to the present invention is shown.

Analogously to the first embodiment, diaphragm 13 comprises an opaque screen on which a light stopping portion 2 and a light passing portion comprising three aperture zones 14, 15 and 16 are defined, wherein the central aperture zone 15 is comparably narrow and the aperture zones 14 and 16 are equal to each other and comparably wide.

Although the diaphragm 13 is illustrated of outer rectangular shape, it could alternatively have any outer shape.

Each aperture zone 14, 15 and 16 has a rectangular shape. In particular, the narrow aperture zone 15 measures 0.5×0.9 mm, while each aperture zone 14 and 16 measures 0.8×1.3 mm. The ratio between the greater dimension or height and the smaller dimension or width of said narrow aperture zone 15 is about 1.8:1, while the ratio between the height and width of said wide aperture zones 14 and 16 is 1.625:1. The two aperture zones 14 and 15 are separated by a cross wall 17 of said light stopping portion 2, having in particular a height of 0.2 mm. Similarly the two aperture zones 15 and 16 are separated by a cross wall 18 of said light stopping portion 2, having in particular a height of 0.2 mm, equal to that of the cross wall 17.

The aperture zone 15 is centred with respect to the horizontal centreline 6 and to the vertical centreline 7 of the diaphragm 13.

The two other aperture zones 14 and 16 are arranged in two different half planes of diaphragm 13, they also being centred with respect to the vertical centreline 7 of diaphragm 13, but symmetrically arranged with respect to the horizontal centreline 6 of diaphragm 13.

The light passing portion of diaphragm 13, defined by the three aperture zones 14, 15 and 16, therefore has two axes of symmetry, the first one along the horizontal centreline 6 of diaphragm 13, the second one along the vertical centreline 7 of diaphragm 13.

The use of diaphragm 13 with respect to diaphragm 1 of FIG. 2 permits obtaining through the central, narrow aperture zone 15 an image which is always vertically centred on the sensitive line of sensor 11. This configuration with respect to that of diaphragm 1 may turn out to be advantageous in situations when it is desired to favour reading high resolution codes in proximity to the reader.

It is worthwhile emphasising that even with the light passing portions of diaphragm 1 of FIG. 2 or of diaphragm 12 of FIG. 13, appropriately translated so that the narrower aperture zone 4 is centred around the horizontal centreline 6 and therefore on the sensitive line of sensor 11, the same advantage in terms of greater resolution from close up would be obtained. However, the single, wider aperture zone 3 would extend (upwards with reference to the figures) to receive rays still further from the paraxial rays, worsening the overall performance.

According to a variant of this embodiment, the aperture zones 14 and 16 may have different heights and/or widths from each other.

Of course there may also be more than three aperture zones, adjoining or separated by cross walls.

As a further alternative, the two or more aperture zones may be partly or totally offset, i.e. the axis of symmetry of the light passing portion extended along the vertical centreline 7 of the diaphragm according to the invention may be absent.

It is furthermore not necessary that two or more rectangular aperture zones are defined, or squares, as a particular form of a rectangular aperture.

Firstly, the corners of the rectangular aperture zones may be rounded, to define substantially rectangular aperture zones.

More generally, the light passing portion may have a more complex shape with non-constant smaller dimension or width, which is advantageously exploited to obtain a good average reading performance in a linear optical code reader.

The smaller dimension or width of the light passing portion may be constant in sections and variable in sections, for example in a light passing portion having the shape of an irregular polygon, or even continuously variable, for example in a light passing portion having one or more curvilinear sides.

It is however particularly advantageous, as indicated above, that at paraxial rays or nearly paraxial rays the light passing portion has a comparably narrow aperture.

Figure 15:
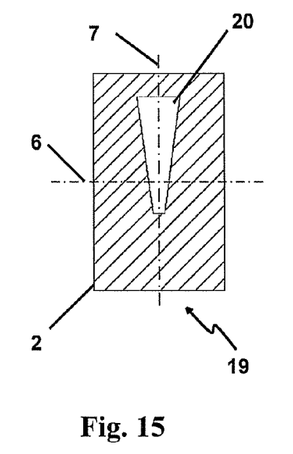
FIG. 15 shows a front view of a fourth embodiment of a diaphragm according to the present invention.

As an example, in FIG. 15 a diaphragm 19 according to a fourth embodiment of the invention is illustrated. Diaphragm 19 has a light passing portion 20 of trapezoidal shape, preferably not aligned with respect to the horizontal centreline 6 of diaphragm 19, so that the light passing portion 20 is comparably narrow at paraxial rays.

Figure 16:
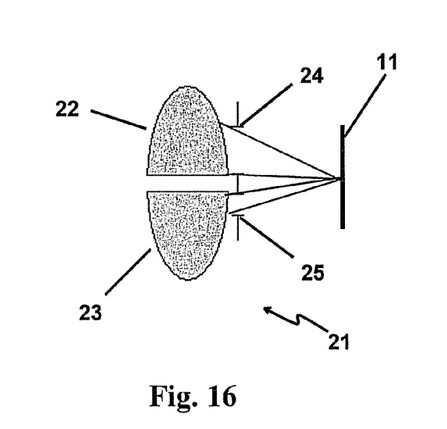
FIG. 16 diagrammatically shows an optical receiving device according to a fifth embodiment of the present invention.

In FIG. 16, a fifth embodiment of the invention is diagrammatically illustrated. According to such an embodiment, an optical receiving device 21 of an optical code reader comprises two half lenses or lens portions 22, 23 separated from each other and each diaphragmed with a single rectangular aperture zone, respectively 24 and 25. The rectangular aperture zones 24 and 25 can each be in its own support or diaphragm, or the two aperture zones 24 and 25 may be on a same support, in an analogous manner to the diaphragm of FIG. 2.

Also in this case, the two aperture zones 24, 25 have a different smaller side or width 5, in the direction perpendicular to the drawing plane. Moreover, they may have a different size of their greater side or height, as illustrated in FIG. 16.

The performance of the optical device 21 of FIG. 16 is entirely analogous to the performance of the optical device of FIG. 3, above commented upon in detail.

Figure 17:
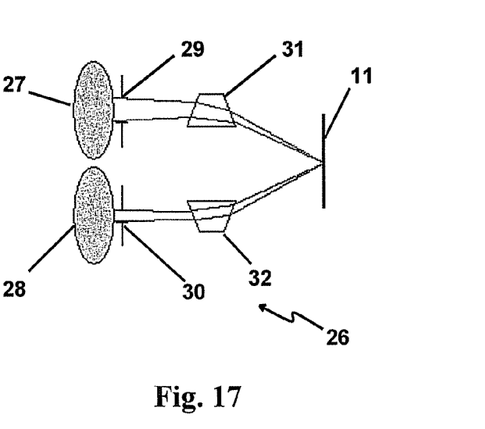
FIG. 17 diagrammatically shows an optical receiving device according to a sixth embodiment of the present invention.

In FIG. 17, a sixth embodiment of the invention is diagrammatically illustrated. According to such an embodiment, an optical receiving device 26 of an optical code reader comprises two objectives 27, 28, identical to each other regarding focal length and magnification, overlapped in the direction orthogonal to the direction of the optical code (scanning direction).

The objectives 27 and 28 are respectively associated with two diaphragms 29, 30, each with a single rectangular aperture zone. Diaphragms 29, 30 may be directly applied one on objective 27 and the other on objective 28 or on one of the lenses composing them, by means of gluing, spraying, sputtering, evaporation, tampography, painting etc.

Also in this case, the aperture zones of diaphragms 29, 30 have a different smaller side or width in the direction perpendicular to the drawing plane. Furthermore, they may have a different size of greater side or height, as illustrated in FIG. 17.

Objective 27 and diaphragm 29 and, respectively, objective 28 and diaphragm 30 form the image of the optical code on the same sensor 11 by means of two prisms 31 and 32, along an optical path of equal length.

Alternatively, it is possible to use either a set of mirrors positioned in an appropriate manner so as to obtain a deflection of the light beams identical to that produced by the two prisms, or diffraction gratings which reproduce the same action of the prisms.

Also the performance of the optical receiving device 26 of FIG. 17 is wholly analogous to that of the optical device of FIG. 3, above commented upon in detail.

Figure 18:
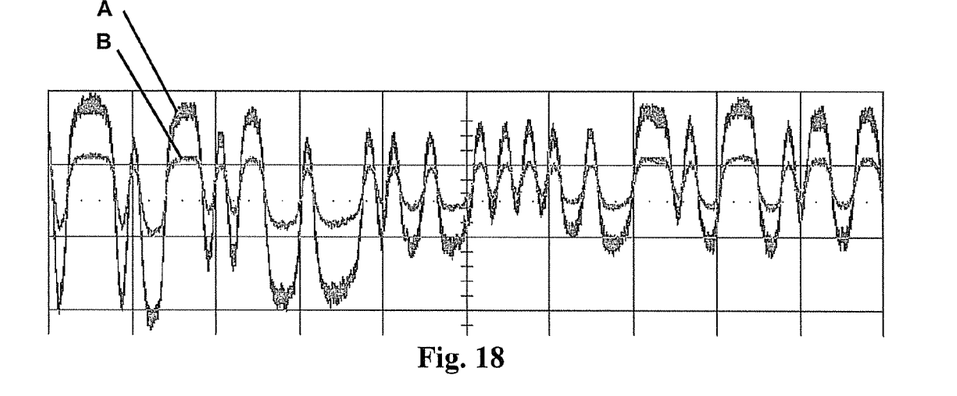
FIG. 18 diagrammatically shows the in phase overlapping of two images of a linear optical code formed according to the present invention.

Indeed, the two images A and B overlap each other in phase on sensor 11, namely the beams passing through the two aperture zones of diaphragms 29 and 30 have maxima, minima and inflexion points of the signal in the same positions, as reproduced in FIG. 18.

The two images A and B are defined with lower or higher contrast according to the position of the linear optical code: the narrow diaphragm 30 permits having a better defined image from close up, while the wide diaphragm 29 permits having a better defined image from a distance, since it is less limited by the diffraction phenomenon.

Without wishing to be bound to any theory, the operation of the invention is believed to be based on the fact that the Point Spread Function (PSF) in focused conditions is the Fourier transform of the function which describes the diaphragm aperture, and it may be seen as the overlapping of the Fourier transform of the function which describes each aperture zone. In defocused conditions, these two contributions are separated. However, along the sensitive line of the sensor 11, the effects of the separation of the two contributions are not noted, because the integral of the PSF in the direction orthogonal to the code direction, which is indicative of the intensity of the light detected by the sensor, is nearly independent from the separation of the two contributions along the direction orthogonal to the code direction.

It is therefore understood that the above described embodiments, i.e. the diaphragms 1, 12, 13 and 19 of FIGS. 1 and 13-15, when used in an optical receiving device of a reader of optical codes for example as illustrated in FIG. 3, as well as the optical receiving devices 21 and 26 of FIGS. 16 and 17, permit implementing the inventive method for the detection of a linear optical code, in particular for improving the depth of field in the detection of a linear optical code, comprising the steps of: (a) forming a first image of the optical code onto a linear sensor, through an objective having first parameters of focal distance and magnification and an aperture having a first smaller dimension in the direction substantially parallel to the direction of the optical code, and (b) simultaneously forming at least one second image of the optical code onto said linear sensor, through said objective or an objective having said first parameters of focal distance and magnification and an aperture having a second smaller dimension in the direction substantially parallel to the direction of the optical code, said second smaller dimension being different from said first smaller dimension, wherein said first and said at least one second image are in phase.

The diaphragm 13 of FIG. 14 permits forming three in phase images, while the diaphragm 19 of FIG. 15 permits forming a plurality of images, all in phase with each other.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A diaphragm for a linear optical code reader, comprising a light stopping portion and a light passing portion, wherein the light passing portion has a first section with a constant first smaller dimension in a direction of an optical code for forming a first image of the optical code onto a linear sensor, the first smaller dimension being smaller than a longitudinal dimension of the first section, the longitudinal dimension of the first section being orthogonal to the direction of the optical code, and at least one second section with a constant second smaller dimension in the direction of the optical code for simultaneously forming a second image of the optical code onto said linear sensor, the second smaller dimension being smaller than a longitudinal dimension of the second section, the longitudinal dimension of the second section being orthogonal to the direction of the optical code, said second smaller dimension being different from said first smaller dimension, the first section and the second section completely extending on different sides of a line parallel to the direction of the optical code.

2. The diaphragm according to claim 1, wherein said light passing portion has at least two substantially rectangular aperture zones with at least two different smaller dimensions.

3. The diaphragm according to claim 2, wherein said light passing portion is formed by two or three substantially rectangular aperture zones with at least two different smaller dimensions.

4. The diaphragm according to claim 3, wherein said substantially rectangular aperture zones are not adjoining.

5. The diaphragm according to claim 4, wherein the substantially rectangular aperture zones are spaced by means of a cross wall of said light stopping portion.

6. The diaphragm according to claim 5, wherein the size of said cross wall between the two substantially rectangular aperture zones has a value in the range between 0.01 and 1.0 mm.

7. The diaphragm according to claim 3, wherein the smaller dimensions of said two or three substantially rectangular aperture zones are not completely offset with respect to each other.

8. The diaphragm according to claim 7, wherein the smaller dimensions of the two or three substantially rectangular aperture zones are centrally aligned with respect to each other.

9. The diaphragm according to claim 3, wherein at least one of said substantially rectangular aperture zones has an aspect ratio greater than 1.2:1.

10. The diaphragm according to claim 3, wherein a first of said substantially rectangular aperture zones has a smaller dimension and a greater dimension which are respectively in the ranges between 0.4 and 2.0 mm and between 0.5 and 4.0 mm, with the greater dimension being larger than the smaller dimension.

11. The diaphragm according to claim 3, wherein at least one of said substantially rectangular aperture zones has a smaller dimension and a greater dimension which are respectively in the ranges between 0.2 and 1.0 mm and between 0.24 and 2.0 mm, with the greater dimension being larger than the smaller dimension.

12. The diaphragm according to claim 3, wherein the two or three substantially rectangular aperture zones include two substantially rectangular aperture zones each having a greater dimension, the greater dimensions extending into different half planes of the diaphragm.

13. The diaphragm according to claim 1, wherein the smallest dimension of the first and second smaller dimensions of the light passing portion is in proximity to a centreline of the diaphragm, wherein the centreline is parallel to the smallest dimension.

14. The diaphragm according to claim 13, comprising a first aperture zone with said smallest dimension of the first and second smaller dimensions, said first aperture zone being centred with respect to the diaphragm, and two aperture zones each having the other of the first and second smaller dimensions, said two aperture zones being symmetrically arranged with respect to the centreline of the diaphragm parallel to the smallest dimension.

15. The diaphragm according to claim 1, wherein said light passing portion has at least one axis of symmetry.

16. An optical receiving device for a linear optical code reader comprising an objective, and a diaphragm according to claim 1.

17. The optical receiving device according to claim 16, wherein the diaphragm is placed between an image plane and the objective.

18. The optical receiving device according to claim 16, wherein the diaphragm is placed between an object plane and the objective.

19. The optical receiving device according to claim 16, wherein the diaphragm is made on a lens of the objective.

20. The optical receiving device according to claim 16, wherein the objective comprises at least two lenses and the diaphragm is placed between said lenses.

21. A method for improving the depth of field in the detection of a linear optical code, comprising the steps of:
(a) forming a first image of the optical code onto a linear sensor, through an objective having first parameters of focal distance and magnification and a first aperture zone having a constant first smaller dimension in a direction substantially parallel to a direction of the optical code, the first smaller dimension being smaller than a longitudinal dimension of the first aperture zone, the longitudinal dimension of the first aperture zone being orthogonal to the direction of the optical code, and
(b) simultaneously forming at least one second image of the optical code onto said linear sensor, through said objective, and a second aperture zone having a constant second smaller dimension in the direction substantially parallel to the direction of the optical code, the second smaller dimension being smaller than a longitudinal dimension of the second aperture zone, the longitudinal dimension of the second aperture zone being orthogonal to the direction of the optical code, said second smaller dimension being different from said first smaller dimension, the first aperture zone and the second aperture zone completely extending on different sides of a line parallel to the direction of the optical code, wherein said first and said at least one second image have maxima, minima, and inflexion points at corresponding positions.

* * * * *